US008264495B2

(12) United States Patent
Khodorkovsky et al.

(10) Patent No.: US 8,264,495 B2
(45) Date of Patent: Sep. 11, 2012

(54) DISPLAY UNDERFLOW PREVENTION

(75) Inventors: Oleksandr Khodorkovsky, Toronto (CA); Mahendra Persaud, Brampton (CA)

(73) Assignee: Advanced Micro Devices, Inc., Sunnyvale, CA (US)

( * ) Notice: Subject to any disclaimer, the term of this patent is extended or adjusted under 35 U.S.C. 154(b) by 928 days.

(21) Appl. No.: 11/877,106

(22) Filed: Oct. 23, 2007

(65) Prior Publication Data

US 2009/0102849 A1 Apr. 23, 2009

(51) Int. Cl.
*G06F 13/372* (2006.01)
*G06F 13/00* (2006.01)
*G09G 5/36* (2006.01)

(52) U.S. Cl. ......................... 345/534; 345/558; 711/154

(58) Field of Classification Search ................... 718/105
See application file for complete search history.

(56) References Cited

U.S. PATENT DOCUMENTS

| | | | | |
|---|---|---|---|---|
| 6,581,164 | B1 * | 6/2003 | Felts et al. | 713/400 |
| 6,865,653 | B2 * | 3/2005 | Zaccarin et al. | 711/154 |
| 7,142,252 | B2 * | 11/2006 | Song | 348/565 |
| 7,215,339 | B1 * | 5/2007 | Dotson | 345/558 |
| 2004/0228411 | A1 * | 11/2004 | Iwamura et al. | 375/240.25 |
| 2004/0263427 | A1 * | 12/2004 | Horigan | 345/3.1 |
| 2005/0057551 | A1 * | 3/2005 | Gong et al. | 345/211 |
| 2006/0017600 | A1 * | 1/2006 | Ho et al. | 341/155 |
| 2008/0010425 | A1 * | 1/2008 | Funk et al. | 711/163 |
| 2008/0056397 | A1 * | 3/2008 | Li et al. | 375/260 |
| 2008/0192873 | A1 * | 8/2008 | Tamura et al. | 375/355 |
| 2008/0297511 | A1 * | 12/2008 | Chou et al. | 345/428 |

* cited by examiner

*Primary Examiner* — Daniel Washburn
*Assistant Examiner* — Donna Ricks
(74) *Attorney, Agent, or Firm* — Sterne, Kessler, Goldstein & Fox P.L.L.C.

(57) ABSTRACT

In devices in which display data is read from a memory for display, display underflow in a processing block is alleviated by controlling a clock frequency driving the processing block. Stages of the processing block send underflow detection signals to underflow prevention logic. The underflow prevention logic controls the frequencies of clock signals generated by a clock generator to alleviate the underflow condition.

23 Claims, 2 Drawing Sheets

DISPLAY UNDERFLOW PREVENTION

BACKGROUND

The inventions generally relate to mobile/portable devices having displays.

For portable/mobile computing devices there are design tradeoffs that must be made relating to weight, size, battery life, etc. One significant tradeoff relates to the picture quality of a display vs. battery life. Good image display suggests the use of high voltages and clock rates to generate the high frequencies required. Preserving battery life suggests the use of lower voltages and clock rates. Typically, mobile computing devices designed for battery power will have its clocks and voltage set to the lowest possible values to conserve battery life. However, the lowest possible values are limited by various conditions including the need to maintain a flawless image on a display device.

Typically, image data is retrieved from memory that is clocked at a memory clock frequency (MCLK). Raw data retrieved from memory is converted one or more times before driving a display device. Such data conversions may include scaling, color space conversions, formatting, etc. Data conversions typically take place in a display block working at a system clock (SCLK) frequency. An image is displayed using a timing controller operating with a pixel clock (PCLK) frequency. If any one of these frequencies is below some necessary threshold level, visual artifacts caused by a display underflow will occur. A display underflow is a condition wherein a pixel required to be displayed is not present at a time when a display raster requires it.

A necessary pixel frequency is derived from timing requirements to support effective screen resolution. Calculation of other frequencies, especially memory clock, is more complex and less accurate. Typically production frequency values are determined during a comprehensive qualification process based on worst anticipated operational conditions. This does not prevent potential display underflow situations with emerging display devices, higher resolutions or more stressful applications that may require higher frequencies. On the other hand, frequencies chosen for the worst operational conditions are higher than necessary for most real life cases and the system therefore consumes more power, contributing to shorter battery life.

Display blocks of modern GPUs are capable to detect and signal underflow conditions, but this capability is used only for informational purposes during qualification. What is needed is a better way to preserve good image display without compromising battery life as much as it is compromised using typical techniques.

SUMMARY

This section is for the purpose of summarizing some aspects of the inventions described more fully in other sections of this patent document. It briefly introduces some preferred embodiments. Simplifications or omissions may be made to avoid obscuring the purpose of the section. Such simplifications or omissions are not intended to limit the scope of the claimed inventions.

The inventions provide a new approach to solving the underflow problem that allows clock frequencies to be better optimized for extended battery life. The arrangement described herein solves the display underflow problem by sending an underflow detection signal to an underflow prevention logic. When a display underflow is detected, the underflow prevention logic controls a clock generator to increase the appropriate frequency until an underflow condition no longer exists. When operational conditions, e.g. resolution or number of active display devices, change, a reset signal is sent to this special block, e.g. by the graphics driver, and initial frequencies are restored.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

The inventions can be implemented in numerous ways, including methods, systems, devices, and computer readable medium. An exemplary embodiment of the inventions is discussed below, but it is not the only way to practice the inventions. It is to be understood that both the foregoing general description and the following detailed description are exemplary and explanatory and are intended to provide further explanation of the invention as claimed.

BRIEF DESCRIPTION OF THE DRAWINGS/FIGURES

These and other features, aspects, and advantages of the present invention will become better understood with regard to the following description, appended claims, and accompanying drawings where:

DETAILED DESCRIPTION

The inventions provide a new approach to the design compromise between flawless display and battery life in a mobile/portable device. It solves the underflow problem that allows clock frequencies to be better optimized for extended battery life. The claimed arrangement solves the display underflow problem by sending an underflow detection signal to an underflow prevention logic. When a display underflow is detected, the underflow prevention logic controls a clock generator to increase the appropriate frequency until an underflow condition no longer exists. When operational conditions, e.g. resolution or number of active display devices, changes, a reset signal is sent to this special block, e.g. by the graphics driver, and new frequencies are determined for the new condition.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
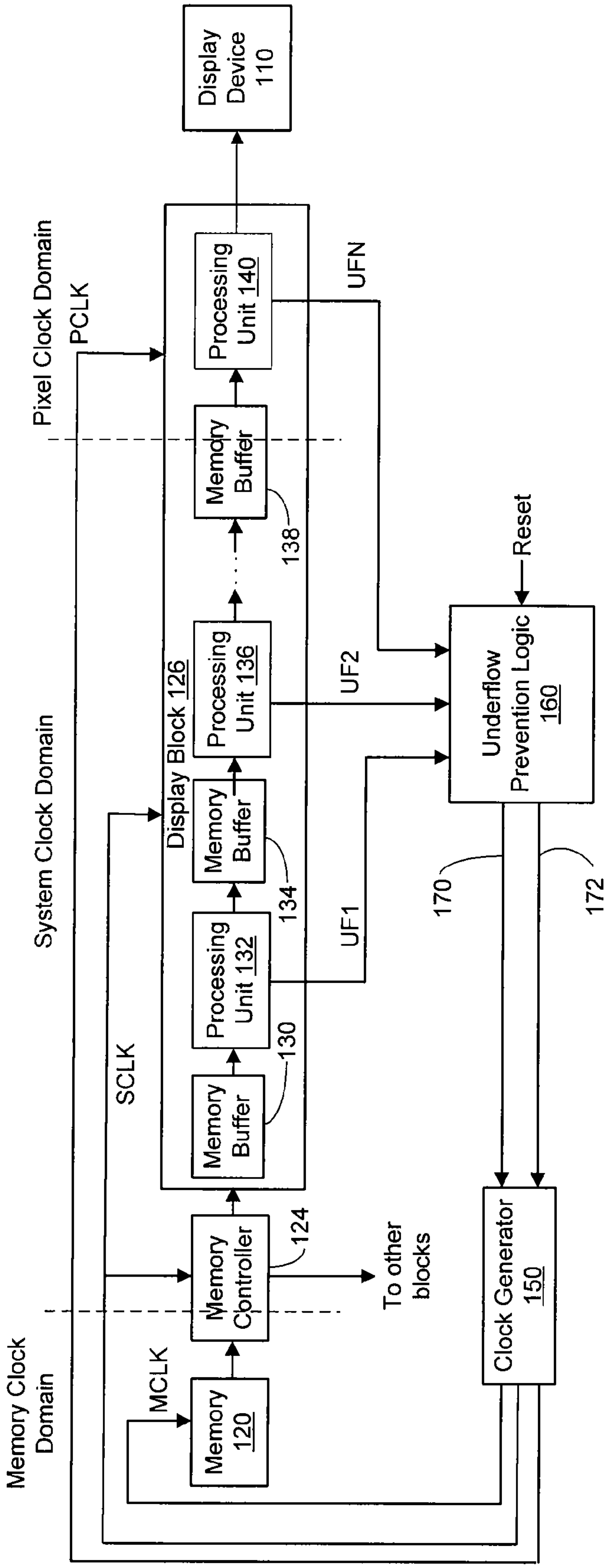
FIG. 1 is a block diagram showing an arrangement according to the inventions.

FIG. 1 is a block diagram showing an implementation of the inventions. An image to be displayed on a display device 110 is formulated from raw image data extracted from a memory 120. A memory controller 124 driven by a system clock SCLK controls the extraction of raw data from memory 120 and provides that raw data to a display block 126. In a typical actual embodiment part of the memory controller uses memory clock MCLK and another part uses the system clock SCLK which may be at different frequencies. Display block 126 may perform various conversions of raw data extracted from memory 120 in order to provide that data in a suitable form for display on display device 110. Such conversions may include, scaling, color space conversion, formatting, etc. Display block 126 includes a plurality N of stages including a first memory buffer 130, a first processing unit 132, a second memory buffer 134, a second processing unit 136, etc. The final stage is indicated by an Nth memory buffer 138 and an Nth processing unit 140.

Output from the Nth memory buffer 138 is processed by a processing unit 140 for display on display device 110. Clock generator circuitry 150 generates various clock signals used to control the extracting and processing of raw image data from memory 120 including a memory clock MCLK, a system clock SCLK, and a pixel clock PCLK. Memory clock MCLK controls memory 120. System clock SCLK controls memory controller 124 and some of the circuits of display block 126. Pixel clock PCLK controls the circuits of display block 126 relating to the final processing of image data to raster display on display device 110.

There is provided an underflow prevention logic block 160 which detects an image underflow condition. Underflow prevention logic block 160 receives inputs UF1, UF2, and UFN from first processing unit 132, second processing unit 126, and the Nth processing unit 140, respectively. Underflow prevention logic 160 controls the frequencies of the various clock signals MCLK, SCLK and PCLK by issuing signals that will cause the clock frequencies to be reprogrammed on lines 170 and 172, respectively as needed. These signals ultimately control clock generator 150. By controlling clock generator 150, underflow prevention logic block 160 causes clock generator 150 to increase or optionally decrease, as necessary, the frequency of the various clock signals MCLK, SCLK, and PCLK that it produces. Typically PCLK is not adjusted. The clock rate PCLK is set depending on screen resolution and refresh rate. PCLK can be determined with high accuracy, while MCLK and SCLK depend on multiple variable operational conditions. The increase in frequency of these three clock signals is temporary and persists until the image underflow condition has been abated.

Each processing unit, 132, 136 and 140 as shown in FIG. 1, reads data from its respective input memory buffer and writes data to its respective output memory buffer. For example, Processing unit 132 reads data from memory buffer 130 and writes (outputs) to memory buffer 134. Similarly, processing unit 136 reads from memory buffer 134 and writes to the next memory buffer. To address memory, each processing unit maintains read and write pointers. Read pointer includes the memory address of the beginning of the data block. Write pointer includes the address of the first available memory location. Under normal circumstances, the read pointer of the next processing unit is always behind the write pointer of the previous processing unit, i.e. the data has to be put in the memory before the next buffer tries to retrieve it. An underflow condition is detected when the read pointer of the next unit approaches the write pointer of the previous unit too close or even exceeds it.

Underflow prevention logic 160 can be implemented in various ways. For example, it can be implemented as a set of hard-wired gates. It can also be implemented as a microprocessor with firmware control, or even by software through register control. The underflow conditions on signals UF1, UF2 . . . UFN can be programmed into the underflow prevention logic 160 using any of the implementations.

Figure 2:
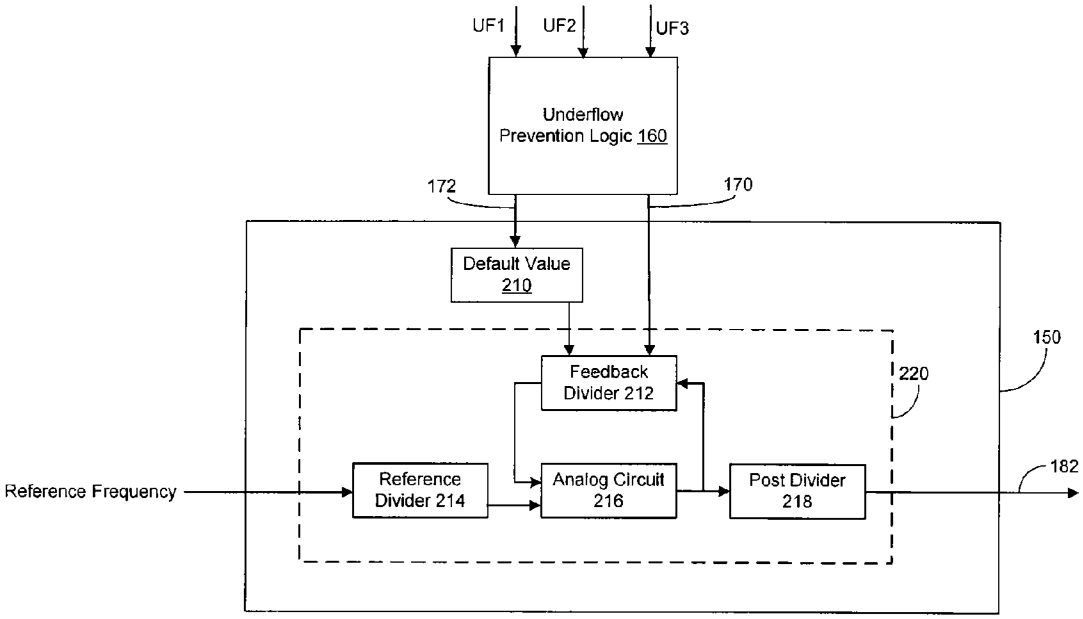
FIG. 2 is a block diagram showing a partial embodiment of clock generator 150 shown generally in FIG. 1.

FIG. 2 is a block diagram showing a partial embodiment of clock generator 150 shown generally in FIG. 1. When an underflow condition is detected, the underflow prevention logic 160 generates a signal 170 that can be used to either increase or decrease to the appropriate frequency. Frequency selection depends on which of the processing units 132, 136, 140, etc. in the processing pipe signaled the underflow. One way to control frequency is by the use of a phase-locked loop (PLL) 220 for clock generation. Underflow prevention logic 160 generates a signal 170 that causes a change in feedback divider 212. When operational conditions change, it can generate a reset signal 172 that forces restoring the initial default feedback divider value. In PLL 220 a reference frequency is input to a reference divider 214. The output of reference divider 214 is coupled to an analog circuit 216 which, in turn, outputs to a post divider 218. Post divider 218 provides an output signal 182 at the appropriate frequency to be used as one of the clock signals MCLK, SCLK and PCLK. There may be more than one such circuit module as shown in FIG. 2. For example, there may be one corresponding to each of the clocks.

In addition to hardware implementations of devices that are adapted to perform the functionality described (such as graphics processing unit, central processing unit, coprocessor, application specific integrated circuit and the like), such devices may also be embodied in software disposed, for example, in a computer usable (e.g., readable) medium configured to store the software (e.g., a computer readable program code). The program code causes the enablement of embodiments of the present invention, including the following embodiments: (i) the functions of the systems and methods disclosed herein; (ii) the fabrication of the systems and methods disclosed herein (such as the fabrication of devices that are enabled to perform the functions of the systems and methods described herein); or (iii) a combination of the functions and fabrication of the systems and methods disclosed herein.

For example, this can be accomplished through the use of general programming languages (such as C or C++), hardware description languages (HDL) including Verilog, Verilog-A, HDL, VHDL, Altera HDL (AHDL) and so on, or other available programming and/or schematic capture tools (such as circuit capture tools). The program code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

Using the approach described, the mobile/portable computing device can be more strongly optimized for preserving battery life because the default clock rates and voltages can be set lower than they would otherwise be set. On those occasions when the clock rates are too low and an underflow condition occurs, the clock rates are temporarily raised and only maintained at a higher rate as long as necessary.

Conclusion

While a specific exemplary embodiment of the inventions has been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A method for preventing display underflow, comprising:

receiving a plurality of underflow signals from a plurality of processing units of a display block;

determining whether an underflow condition occurred for one of the plurality of processing units based on the underflow signals;

in response to a determination that the underflow condition occurred, generating a control signal to adjust a frequency of a clock signal controlling the one of the plurality of processing units to alleviate the underflow condition, wherein the adjusting the frequency of the clock signal depends on which of the plurality of the processing units caused the underflow condition; and in response to a determination that the underflow condition is alleviated, generating a reset signal to restore the frequency of the clock signal to a default frequency.

2. The method according to claim 1 further comprising:

retrieving data from a memory to be displayed on a display device.

3. The method according to claim 1, wherein the frequency of the clock signal is adjusted by generating a signal using a phase-locked loop (PLL) controlled by control signal.

4. The method according to claim 3, wherein the control signal includes an increment signal causing the PLL to increase the frequency of the clock signal.

5. The method according to claim 3, wherein the control signal includes a decrement signal causing the PLL to decrease the frequency of the clock signal.

6. The method according to claim 3, wherein the reset signal causes the PLL to revert to the default frequency of the clock signal.

7. The method according to claim 1, wherein the plurality of processing units of the display block are included in at least one graphics processing unit.

8. A display arrangement for preventing display underflow, comprising:

a display block for receiving data from a memory to be displayed on a display, the display block including serially connected memory buffers and processing units, each processing unit generating an underflow signal;

a clock generator constructed and arranged to provide a clock signal to control the memory buffers and the processing units; and underflow prevention logic constructed and arranged to receive the underflow signals from the processing units, determine whether an underflow condition occurred, generate a control signal to control a frequency of the clock signal provided by the clock generator to alleviate the underflow condition if the underflow condition occurred, determine whether the underflow condition is alleviated, and generate a reset signal to restore the frequency of the clock signal to a default frequency if the underflow condition is alleviated, wherein the controlling the frequency of the clock signal depends on which of the processing units caused the underflow condition.

9. The display arrangement according to claim 8, wherein the clock generator comprises:

a phase-locked loop (PLL) circuit constructed and arranged to receive the control signal from the underflow prevention logic and to generate an output frequency dependent upon the control signal.

10. The display arrangement according to claim 9, wherein the control signal is an increment and/or decrement signal from the underflow prevention logic signaling that the frequency of clock signal from the clock generator is to be changed.

11. The display arrangement according to claim 9, wherein the reset signal from the underflow prevention logic signals that the frequency of the clock signal from the clock generator is to be reset to the default value.

12. The display arrangement according to claim 9, wherein the display block includes at least three stages of memory buffers and processing units.

13. The display arrangement according to claim 8, further comprising a memory controller which controls the reading of data from memory into the display block, the memory controller being controlled by a memory clock signal MCL provided by the clock generator and a frequency of which is controlled by the underflow prevention logic.

14. The display arrangement according to claim 8, wherein an operation of the display block is controlled by a system clock SCLK provided by the clock generator and a frequency of which is controlled by the underflow prevention logic.

15. The display arrangement according to claim 8, wherein an operation of at least a portion of the display block is controlled by a pixel clock PCLK provided by the clock generator and a frequency of which is controlled by the underflow prevention logic.

16. The display arrangement according to claim 8, wherein the display arrangement comprises hardware description language instructions stored on a computer readable medium.

17. The display arrangement according to claim 16, wherein the hardware description language instructions comprises instructions in one of: Verilog hardware description language, Verilog-A hardware description language software, and VHDL hardware description language software.

18. The display arrangement according to claim 8, wherein the display block including the serially connected memory buffers and processing units is included in at least one graphics processing unit.

19. A non-transitory computer readable media containing program code which when executed prevents display underflow by carrying out the following process:

receiving a plurality of underflow signals from a plurality of processing units of a display block;

determining whether an underflow condition occurred for one of the plurality of processing units based on the underflow signals;

in response to a determination that the underflow condition occurred, generating a control signal to adjust a frequency of a clock signal controlling the one of the plurality of processing units to alleviate the underflow condition, wherein the adjusting the frequency of the clock signal depends on which of the plurality of the processing units caused the underflow condition; and in response to a determination that the underflow condition is alleviated, generating a reset signal to restore the frequency of the clock signal to a default frequency.

20. The non-transitory computer readable media according to claim 19, wherein the process further includes:

reading data from a memory to be displayed on a display device.

21. The non-transitory computer readable media according to claim 20, wherein the process is carried out by executing a hardware description language.

22. The non-transitory computer readable media according to claim 19, wherein the process is carried out by executing a hardware description language.

23. The non-transitory computer readable media according to claim 19, wherein the plurality of processing units of the display block are included in at least one graphics processing unit.

* * * * *

UNITED STATES PATENT AND TRADEMARK OFFICE

CERTIFICATE OF CORRECTION

PATENT NO. : 8,264,495 B2
APPLICATION NO. : 11/877106
DATED : September 11, 2012
INVENTOR(S) : Khodorkovsky et al.

It is certified that error appears in the above-identified patent and that said Letters Patent is hereby corrected as shown below:

IN THE CLAIMS:

Column 6
Line 28, Claim 13, please replace "MCL" with --MCLK--.

Signed and Sealed this
Twentieth Day of November, 2012

David J. Kappos
*Director of the United States Patent and Trademark Office*